(12) United States Patent
Hammock et al.

(10) Patent No.: US 8,772,219 B1
(45) Date of Patent: Jul. 8, 2014

(54) OIL SPILL BIOREMEDIATION COMPOSITIONS AND PROCESSES FOR USE

(71) Applicant: Clean Control Corporation, Warner Robins, GA (US)

(72) Inventors: Cory S. Hammock, Macon, GA (US); Stephen Davison, Perry, GA (US)

(73) Assignee: Clean Control Corporation, Warner Robins, GA (US)

( * ) Notice: Subject to any disclaimer, the term of this patent is extended or adjusted under 35 U.S.C. 154(b) by 0 days.

(21) Appl. No.: 13/838,848

(22) Filed: Mar. 15, 2013

(51) Int. Cl.
*C11D 1/74* (2006.01)
*B01D 17/05* (2006.01)

(52) U.S. Cl.
USPC ........... 510/365; 210/922; 210/923; 210/924; 210/925; 510/462; 510/505

(58) Field of Classification Search
USPC .......... 510/365, 462, 505; 210/922, 923, 924, 210/925
See application file for complete search history.

(56) References Cited

U.S. PATENT DOCUMENTS

| | | | |
|---|---|---|---|
| 4,110,213 A | 8/1978 | Tennant et al. | |
| 4,502,962 A | 3/1985 | Becker et al. | |
| 5,104,548 A | 4/1992 | Gabrick | |
| 5,112,495 A | 5/1992 | Bartha et al. | |
| 5,436,160 A | 7/1995 | Varadaraj et al. | |
| 5,618,468 A | 4/1997 | Canevari et al. | |
| 5,624,843 A | 4/1997 | Varadaraj et al. | |
| 5,783,525 A | 7/1998 | Blanco et al. | |
| 5,807,724 A | 9/1998 | Resnick | |
| 6,194,473 B1 * | 2/2001 | Lessard et al. | 516/63 |
| 6,248,234 B1 | 6/2001 | Cline | |
| 6,620,769 B1 | 9/2003 | Juppe et al. | |
| 6,699,390 B1 * | 3/2004 | Griffin et al. | 210/608 |
| 7,231,976 B2 | 6/2007 | Berry et al. | |
| 7,392,845 B2 | 7/2008 | Berry et al. | |
| 2004/0235668 A1 | 11/2004 | Abribat et al. | |
| 2005/0222340 A1 | 10/2005 | Vonk et al. | |
| 2008/0042101 A1 | 2/2008 | Bryant et al. | |
| 2008/0110618 A1 | 5/2008 | Quintero et al. | |

OTHER PUBLICATIONS

Congress of The United States, Office of Technology Assessment, "Bioremediation for Marine Oil Spills," OTA-BP-O-70, May 1991.
Sorial, George and James W. Weaver, "Characteristics of Spilled Oils, Fuels, and Petroleum Products: Dispersant Effectiveness Data for a Suite of Environmental Conditions—The Effects of Temperature, Volatilization, and Energy," EPA/600/R-04/119, Sep. 2004.
Author unknown, "Mechanism of the Formation of a Mousse," Internet. Available at http://www.pcs.gr.jp/doc/EMousse/text. htm#INVESTIG6. Available at least as of Dec. 29, 2010.
Kanya, T.C. Sindhu et al., "Characterization of wax esters, free fatty alcohols and free fatty acids of crude wax from sunflower seed oil refineries," Food Chem. vol. 101, Issue 4, pp. 1552-1557, 2007.
Buisson, D. and S.F. Hannan, "Studies on Wax Esters in Fish," New Zealand Institute of Chemistry. Available at least as of Dec. 2012.
Cooney, Joseph J., "Microorganisms Capable of Degrading Refractory Hydrocarbons in Ohio Rivers," United States Department of Interior B-060-OHIO, Dec. 1980.
ASTM International, "Standard Test Method for Laboratory Oil Spill Dispersant Effectiveness Using the Swirling Flask," ASTM F2059-06, 2006.
U.S. Environmental Protection Agency, "Swirling Flask Dispersant Effectiveness Test, Revised Standard Dispersant Toxicity Test, and Bioremediation Agent Effectiveness Test," 40 C.F.R. Part 300, Appendix C, Jul. 1, 2003.
U.S. Appl. No. 61/491,079, filed May 27, 2011, Joseph A. Resnick et al.
U.S. Appl. No. 61/491,462, Joseph A. Resnick et al.
U.S. Appl. No. 61/576,321, filed Dec. 15, 2011, Cory S. Hammock et al.

* cited by examiner

*Primary Examiner* — Charles Boyer
(74) *Attorney, Agent, or Firm* — PatentBest; Andrew McAleavey

(57) ABSTRACT

Oil remediation compositions and methods for preparing such compositions are disclosed. The oil remediation compositions comprise particles of a first wax ester, such as a synthetic beeswax, and an anti-caking agent. The anti-caking agent may be a natural cellulosic material, such as particulate hay. In methods for preparing these compositions, the hydrophilic-lipophilic balance (HLB) of the composition may be adjusted by adding a second wax ester or fatty acid ester with a different HLB to reach a desired HLB for the composition that is based on defined environmental conditions, such as the temperature and salinity of the water in which oil has been spilled, the nature of the oil spilled, and the degree of evaporation of organic compounds.

17 Claims, 2 Drawing Sheets

OIL SPILL BIOREMEDIATION COMPOSITIONS AND PROCESSES FOR USE

BACKGROUND OF THE INVENTION

1. Field of the Invention

The invention relates to bioremediation compositions for oil spills and to processes for using those compositions.

2. Description of Related Art

The state of the art for remediation of oil spills in marine and freshwater environments involves use of chemical dispersants. In situ burning and mechanical separation are also extensively used. These methods have advantages and disadvantages. Bioremediation is one of the most promising alternatives to the use of chemical dispersants.

Biodegradation is a natural process, and with enough time, microorganisms can eliminate many components of oil from the environment. Prior art bioremediation approaches for marine and freshwater oil spills fall into three major categories: (1) stimulation of indigenous microorganisms through addition of nutrients (i.e., fertilization); (2) introduction of special assemblages of naturally occurring oil-degrading microorganisms (i.e., seeding); and (3) introduction of genetically engineered microorganisms (GEMs) with special oil-degrading properties. Stimulation of indigenous organisms by the addition of nutrients is the approach that has been tested most rigorously. This approach is viewed by many researchers as the most promising one for responding to most types of marine and freshwater spills.

More development and testing of both fertilization and seeding technologies are needed before on-scene coordinators or others responsible for oil spill cleanup would be comfortable advocating their use. Most decision makers prefer more traditional methods, and usually are not willing to experiment during a real spill. Bioremediation technologies for response to marine and freshwater oil spills, although promising, are still in the experimental phase.

The rate at which petroleum biodegradation occurs is thought to be limited by the rate at which a mousse is formed. A mousse is a water-in-oil emulsion, typically formed after an oil spill when heavy wave action causes water to be entrained in the insoluble components of spilled oil. Factors influencing mousse formation after crude oil spills in salt water environments are well characterized. The formation of a mousse is attributed to the heavy constituents such as wax, resin, and asphaltene.

Several experimental approaches involve the use of natural wax esters. For example, U.S. Pat. No. 5,807,724 describes techniques for "microencapsulating" oil-degrading bacteria in shells of natural beeswax. U.S. Pat. No. 6,699,390 discloses an alternative approach, in which microspheres of natural beeswax are used to encourage indigenous bacterial growth. Unfortunately, the processes of microencapsulation and microsphere manufacture are difficult and require special equipment. Moreover, the mechanism by which natural wax esters act in oil spill remediation is not well characterized.

Another problem lies in the fact that the oil remediation compositions of the prior art are generally formulated to function in a particular set of environmental conditions. If a spill occurs in conditions different from those anticipated, the composition may be less effective or ineffective.

BRIEF DESCRIPTION OF THE FIGURES

The invention will be described with respect to the following figures, in which.

SUMMARY OF THE INVENTION

Figures 1, 2:
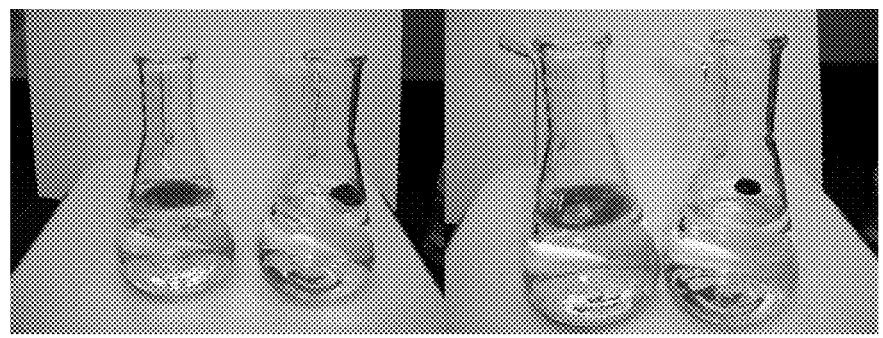
FIG. 1 is a photograph of flasks containing an untreated simulated oil spill and an oil spill treated with a composition according to an embodiment of the invention taken one hour after the commencement of the test.
FIG. 2 is a photograph of the flasks of FIG. 1 taken 24 hours after commencement of the test.

One aspect of the invention relates to compositions for oil remediation. The compositions include a natural or synthetic first wax ester and an anti-caking agent. The composition also includes a second wax ester or a fatty acid ester with a different hydrophilic-lipophilic balance (HLBs) than the first wax ester, which is added to bring the composition to a desired HLB. In some embodiments, for example, the first wax ester may be a synthetic beeswax, the anti-caking agent may be hay, and an additional fatty acid ester, such as sorbitan monostearate, may be included to adjust the HLB of the composition. The components are most advantageously chosen such that the final composition is in the form of a free-flowing dry powder, although other forms may be used.

Another aspect of the invention relates to methods for preparing oil remediation compositions according to embodiments of the present invention. These methods comprise creating particles of a first wax ester, adding an anti-caking agent, and adjusting the HLB of the composition by adding a second wax ester or fatty acid ester with an HLB different from that of the first wax ester. The adjusted HLB of the composition depends on a number of factors, including the composition of the oil spilled and the environmental conditions.

These and other aspects, features, and advantages of the invention will be set forth in the description that follows.

DETAILED DESCRIPTION

Studies conducted by the present inventors indicate that wax ester compositions can be formulated to accelerate mousse formation and provide nutrients for mineral and oil-degrading bacteria uptake in a wide range of temperatures and salinity conditions found in nature, thereby bringing oil polluted environments to the natural state more efficiently.

The term "wax ester" includes all esters of long chain carboxylic acid reacted with long chain alcohols. The generalized reaction is described below in Equation (1):

$$RCO_2H + R'OH \leftrightarrows RCO_2R' + H_2O \qquad (1)$$

Natural waxes are commercially available and widely used in wide range of applications as components of food, drugs, cosmetics, printing and leather industries, soaps, polishes and candles.

Natural waxes typically contain a wide variety of simple lipid components, such as hydrocarbons, esters, fatty alcohols, ketones, mono-, di-, tri-acyl glycerols and sterol esters long chain fatty esters ($C_{16}$-$C_{54}$), comprised of one unit of fatty alcohol and one unit of fatty acid through an ester linkage and n-Triacontanol ($C_{30}$), a plant growth regulator.

Natural wax esters, alcohols, and fatty acids are available from many sources, such as seed hulls, tank settlings, rice bran, carnauba, sugar cane, beeswax and fish oils (such as orange roughy). One particularly suitable wax ester for use in the present invention is a synthetic beeswax, yellow synthetic beeswax JH-1545, manufactured by Lambent Technologies Corporation (Gurnee, Ill., USA). This synthetic beeswax is a proprietary wax ester formed by a reaction of a $C_{20-22}$ fatty acid with a $C_{20-22}$ fatty alcohol.

Natural and synthetic wax esters with up to forty-four carbon atoms and at most one double bond form a lens on water instead of spreading out like other oils, and are particularly suitable for use in embodiments of the present invention. Generally speaking, these are formed by the reaction of a $C_{14-24}$ fatty acids and $C_{20-34}$ fatty alcohols. In that case, the fatty acid should be at least $C_{12}$, preferably greater than $C_{14}$, and most preferably between $C_{14}$-$C_{22}$. The fatty alcohol should be at least $C_{12}$, preferably greater than $C_{20}$, and most preferably between $C_{30}$-$C_{34}$, with an HLB of less than 2.0.

In embodiments of the present invention, wax esters are the predominant wax component, although other wax components and fatty acid derivatives may be incorporated as long as the overall HLB of the system is adjusted to match the environmental, temperature, and salinity conditions thereof.

As was noted above, one aspect of the invention relates to processes for preparing oil remediation compounds. The first step of one exemplary process is to spray dry a wax ester (HLB<2.0; e.g. 1.3) to produce a free-flowing powder that can be readily applied to oil polluted environments by manual or mechanical broadcasting. The spray dryer used may include an atomizer or spray nozzle to disperse the liquid or slurry into a controlled drop size spray. The most common of these are rotary nozzles and single-fluid pressure swirl nozzles. Alternatively, two-fluid or ultrasonic nozzles may be used. Particle sizes from 10 to 500 microns may appropriate, with 100 to 200 micron size range preferred. The dry powder should be free flowing.

The second step of the process is to amend or mix the wax ester with an anti-caking agent. A number of anti-caking agents are known in the art, including activated charcoal, silicon dioxide, and silica, and any conventional anti-caking agent may be used. However, in embodiments of the invention, it may be particularly advantageous to use natural, plant-based cellulosic anti-caking materials, such as particulate hay. Hay is already used as an absorbant in traditional oil remediation techniques, and it often carries natural microorganisms that are capable of degrading oils. In particularly advantageous embodiments of the invention, the hay is not processed to remove any natural microorganisms that it may be carrying.

The third step of the process is to adjust the HLB of the total wax ester composition to optimize water in oil formation properties to accelerate liquid crystal (mousse) formation in the natural environment. This may be done using one or more additional wax esters or fatty acid esters. Wax esters and fatty acid esters used to adjust the HLB of the composition will generally have HLBs different and greater than the HLB of the first or primary wax ester in the composition. One example of a suitable fatty acid ester is sorbitan monostearate, a sorbitan ester of steric acid, with an HLB of 9.6. Adjusting the HLB using additional wax esters and/or fatty acid esters optimizes the final composition for varying temperatures and salinity conditions found in differing environments. The HLB can be pre-optimized in the laboratory or on-site. The HLB adjustment is dependent on five factors: (1) composition of the oil spilled; (2) degree of evaporation of lighter components (if present) since oil was spilled; (3) temperature of water; (4) salinity of water; and (5) HLB of wax esters used in Steps 1 and 3.

In general, any wax ester or fatty acid ester with an HLB greater than about 2.0 can be used to adjust the HLB of the composition. Other suitable compounds may include sorbitan monolaurate, sorbitan monomyristate, sorbitan monopalmitate, sorbitan monostearate, sorbitan monooleate, sorbitan sesquistearate, sorbitan sesquioleate, sorbitan tristearate, sorbitan trioleate, glycerol monostearate, glycerol monooleate, glycerol distearate, glycerol dioleate, PEG monostearate, PEG monooleate, PEG distearate, PEG dioleate, sucrose monostearate, and sucrose monooleate. More generally, any natural or synthetic ester may be used, including those made by esterification of carboxylic acids with alcohols in the presence of a suitable catalyst, or by ester exchange or transesterification under similar conditions. Additionally, in some embodiments, fatty alcohol ethers may be used to adjust the HLB of the overall composition, although these are generally more acutely toxic to aquatic environments.

The additional wax esters or fatty acid esters used in the composition may have other advantageous properties and may be selected for their ability to produce desired physical characteristics in the final composition as well as for their ability to adjust the HLB. The melting point of the additional wax esters or fatty acid esters is one consideration. For example, sorbitan monostearate, with its melting point in the range of 56-58° C., helps to ensure that the final composition is a free-flowing powder under normal storage conditions.

The three-step process described above offers the advantage of maximum ability to accelerate mousse formation and biodegradation of oil pollution in the natural environment that can be used as an off the shelf bioremediation technology with equal effectiveness under a wide variety of conditions found in oil spill environments. Particularly suitable compositions and preparation methods are set forth in the following examples.

Example 1

A 10 gram (g) sample of a wax ester composition in accordance with the present invention was prepared by mixing, in laboratory scale apparatus, the ingredients listed in Table 1.

TABLE 1

Ingredients for Example 1.

| Ingredients | V-001-1Bb-2293 | | V-001-1Bc-2294 | |
| --- | --- | --- | --- | --- |
| | Weight Percent (%) | Grams (g) | Weight Percent (%) | Grams (g) |
| Natural wax ester (100-200 micron) | 87.25 | 8.725 | 67.50 | 6.750 |
| Hay (100-200 micron) | 12.75 | 1.275 | 12.75 | 1.275 |
| Sorbitan monostearate (100-200 micron) | 0.00 | 0.00 | 19.75 | 1.975 |
| Totals | 100.00 | 10.000 | 100.00 | 10.000 |

The mixing procedure employed in producing the 10 g sample included initially weighing powders onto a weighing paper on analytical balance and then placing the powder into a 24 mL glass vial and inverting until thoroughly blended. The combined mixture was then stored for use as Test Samples for the performance testing detailed hereinafter in Example 2.

Example 2

A series of simulated oil spills were performed in the laboratory to compare the effectiveness of the current invention, optimizing the hydrophobic-lipophilic balance (HLB) for water in oil formation properties using plant-derived wax esters to accelerate mousse formation, provide an integrated carbon source in the presence of mineral nutrients and indigenous microorganisms under various and salinity conditions. The ingredients for these simulated oil spills are listed below in Table 2. The numbers from 5-9 refer to flask numbers.

TABLE 2

Ingredients for Example 2.

| | Grams (g) | | | | |
|---|---|---|---|---|---|
| | Freshwater | | Salt Water | | |
| Ingredients | 5 | 6 | 7 | 8 | 9 |
| M63 Minimal (mineral) Nutrient | 95 | 95 | — | — | — |
| 3.3% INSTANT OCEAN ® | — | — | 95 | 95 | 95 |
| Crude Oil (EPA-API Reference So. Louisiana) | 0.2 | 0.2 | 0.2 | 0.2 | 0.2 |
| Bioremediation composition V-001-1Bb-2293 | — | 0.025 | — | 0.025 | — |
| Bioremediation composition V-001-1Bc-2294 | — | — | — | — | 0.025 |

Ingredients 1-3 were added in order listed to a 125 mL flask with side spout. (A total of 5 flasks.) Flasks were placed on IKA shaker set to 120 r/min. Bioremediation compositions were added slowly over the surface of the crude oil. Visual observations were made at regular intervals to determine how/if the compositions accelerated water-in-oil mousse formation under the conditions of the test. Over the course of the next four months, visual observations also included formations of biofilms, as well as side spout sampling to culture for identification of potentially oil-degrading microorganisms. When necessary, water levels were amended with either M63 mineral nutrient or INSTANT OCEAN® solution to maintain initial water level in flasks.

FIGS. 1 and 2 are photographs of flasks containing an untreated simulated oil spill and an oil spill treated with a composition according to an embodiment of the invention, shown at 1 hour and 24 hours after the beginning of the experiment. Flask nos. 5 and 6 from Table 2 are shown in FIGS. 1 and 2 and in the other figures described below. In FIGS. 1 and 2, it can be seen that the HLB optimized bioremediation composition of the current invention (the flask on the right in each of FIGS. 1 and 2) causes the spilled crude oil to form a lens on water instead of spreading out like the oil in the untreated simulated spills (left in FIGS. 1 and 2).

Figures 3, 4:
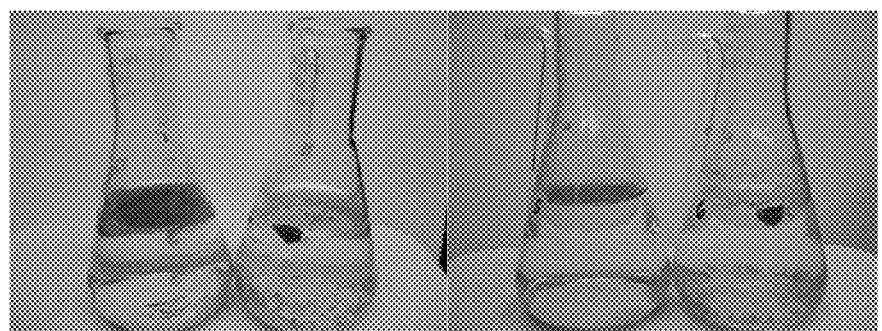
FIG. 3 is a photograph of the flasks of FIG. 1 taken one week after the commencement of the test.
FIG. 4 is a photograph of the flasks of FIG. 1 taken three weeks after the commencement of the test.

FIGS. 3 and 4 are photographs taken after one week and three weeks, respectively. In FIG. 3, it can be seen that the lens has formed a liquid crystal water-in-oil (w/o) emulsion and microorganisms have begun to form a biofilm, and in FIG. 4, the process has progressed significantly.

Figures 5, 6:
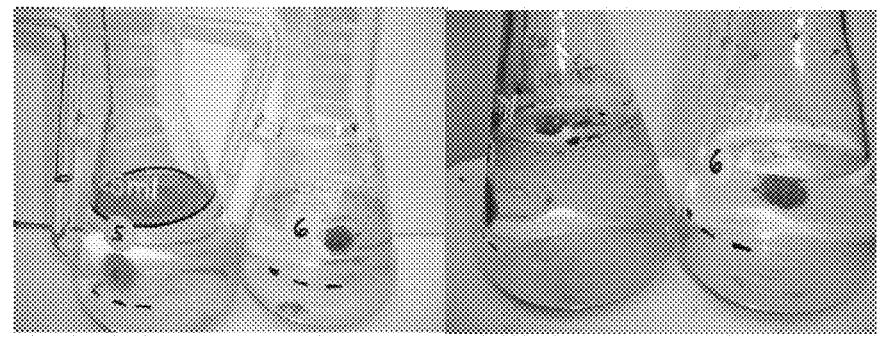
FIG. 5 is a photograph of the flasks of FIG. 1 taken seven weeks after the commencement of the test.
FIG. 6 is a photograph of the flasks of FIG. 1 taken fifteen weeks after the commencement of the test.

FIGS. 5 and 6 are photographs taken after seven weeks and fifteen weeks, respectively. In FIG. 5, it can be seen that the biofilm over the lens has increased, and in FIG. 6, the process as progressed significantly.

Figure 7:
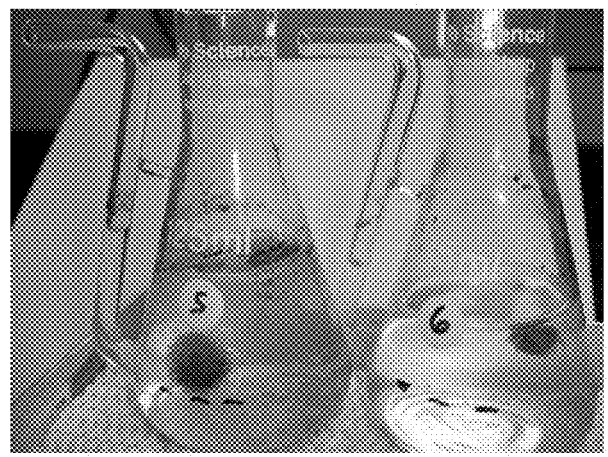
FIG. 7 is a photograph of the flasks of FIG. 1 at the conclusion of testing, taken sixteen weeks after the commencement of the test.

FIG. 7 is a photograph taken after sixteen weeks, after the conclusion of testing. In FIG. 7, the two test environments clearly appear very different. The environment on the left (without bioremediation composition) is beginning to show evidence of naturally occurring mousse formation; however, the mousse is not well defined and adheres to surfaces due to the lack of biofilm coating. The environment on the right (with bioremediation composition) is much cleaner and the resulting liquid crystal is more easily removed from surfaces.

Separation of the oil soluble components and subsequent gravimetric analysis indicates that the 50% of the original oil in the environment containing bioremediation composition remains, compared to 70% without. It is believed that the 30% loss in weight in the environment on the left (without bioremediation composition) is due almost entirely due to evaporation and dissolution of the $C_6$-$C_9$ components of the crude oil. Although it is probable that evaporation and dissolution of the $C_6$-$C_9$ components in the environment containing bioremediation composition was slowed significantly as they became a part of the water-oil liquid crystal formed during the first week of the study, biofilm observation indicates that the liquid crystal structure was less toxic to the organisms present.

Cultures obtained from the environments at the conclusion of the studies indicated that while without the bioremediation composition, there were $3.65 \times 10^7$ cfu per mL with 6 unique colony types. With bioremediation composition, there were $9.8 \times 10^6$ cfu per mL with 10 unique colony types. Preliminary DNA bacterial sequencing data from flask 6 of Example 2 (freshwater) indicates that the bacteria were of the family Chitinophagaceae, the genuses *Achromobacter* and *Rhizobium*, and the species *Microbacterium foliorum* and *Staphylococcus aureus*.

Additional studies have shown that temperature and salinity variations in the environment influence the formation of liquid crystals (mousse). For instance, in oceanic salinity conditions (i.e. 3.3% sea salt) the HLB of the wax ester component of the current invention should be increased to prevent hyper-mousse formation that hinders efficient liquid crystal formation. For instance, when bioremediation composition V-001-1Bb-2293 (which was developed for freshwater environments) is used in saltwater, the liquid crystals form too rapidly. In such a case, bioremediation composition V-001-1Bc-2294 resolves this problem.

While the invention has been described with respect to certain illustrative embodiments, the embodiments are intended to be exemplary, rather than limiting. Modifications and changes may be made within the scope of the invention, which is defined by the appended claims.

What is claimed is:

1. An oil remediation composition, comprising:
   particles of a first wax ester, the particles having a size in the range of from about 10 μm to about 500 μm and a first hydrophilic-lipophilic balance (HLB);
   an anti-caking agent wherein the anti-caking agent is hay;
   a second wax ester or fatty acid ester having a second HLB different from the first HLB, the second wax ester or fatty acid ester being present in a quantity sufficient to give the oil remediation composition a desired HLB different from the first HLB and the second HLB.

2. The composition of claim 1, wherein the first wax ester comprises a synthetic beeswax.

3. The composition of claim 1, wherein the hay has a particle size from about 100 μm to about 200 μm.

4. The composition of claim 1, wherein the second wax ester or fatty acid ester comprises sorbitan monostearate.

5. The composition of claim 4, wherein the sorbitan monostearate has a particle size from about 100 μm to about 200 μm.

6. The composition of claim 1, wherein the particles of the first wax ester have a size from about 100 μm to about 200 μm.

7. The composition of claim 1, wherein the first HLB is less than about 2.

8. The composition of claim 7, wherein the second HLB is greater than about 2.

9. The composition of claim 8, wherein the second HLB is in a range from about 2 to about 20.

10. A method for preparing an oil remediation composition, comprising:
    preparing particles of a first wax ester having a size in the range of about from about 10 µm to about 500 µm, the first wax ester having a first hydrophilic-lipophilic balance (HLB);
    adding an anti-caking agent wherein the anti-caking agent is hay;
    determining a desired HLB for the oil remediation composition sufficient to form a water-in-oil emulsion using the oil remediation composition in defined environmental conditions; and
    adding at least a second wax ester or fatty acid ester having a second HLB different from the first HLB in a quantity sufficient to achieve the desired HLB.

11. The method of claim 10, wherein the first wax ester comprises a synthetic beeswax.

12. The method of claim 10, wherein the second wax ester or fatty acid ester comprises sorbitan monostearate.

13. The method of claim 10, wherein the defined environmental conditions comprise defined conditions of at least temperature and salinity.

14. The method of claim 10, wherein the first HLB is less than about 2.

15. The method of claim 10, wherein the second HLB is greater than about 2.

16. The method of claim 10, wherein the first HLB is less than about 2 and the second HLB is in a range from about 2 to about 20.

17. The method of claim 10, wherein the second wax ester has a melting point in the range of about 56-58° C.

* * * * *